No. 850,474. PATENTED APR. 16, 1907.
I. R. GUILFORD.
CAR FENDER.
APPLICATION FILED JAN. 18, 1907.
2 SHEETS—SHEET 2.
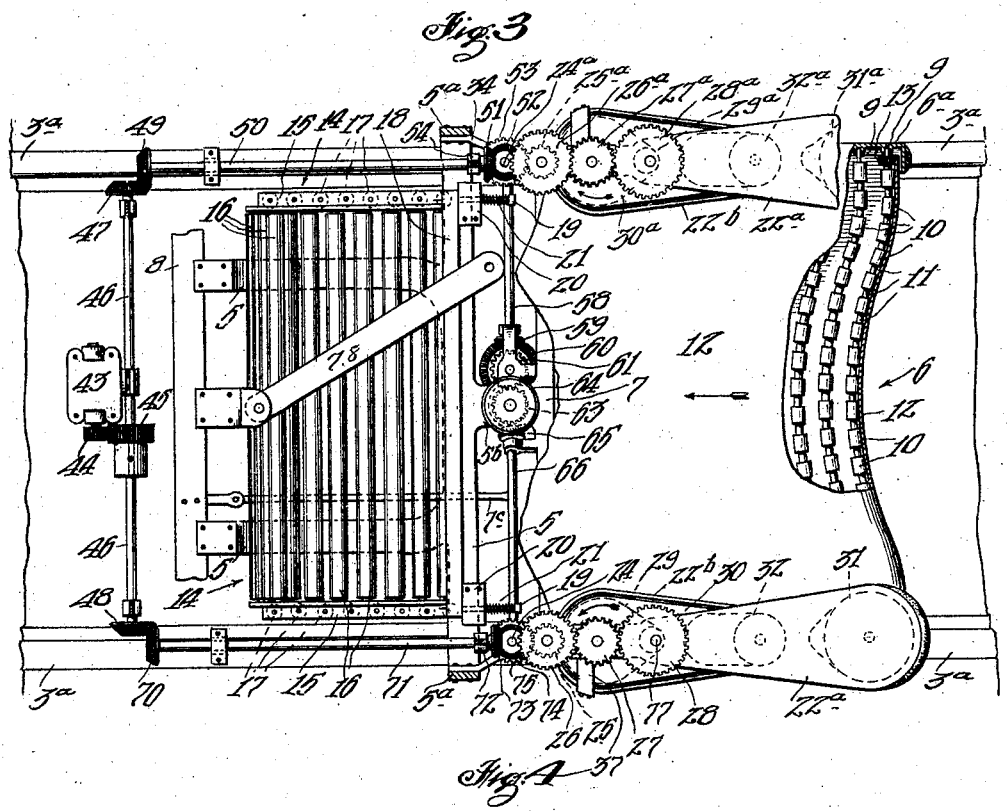
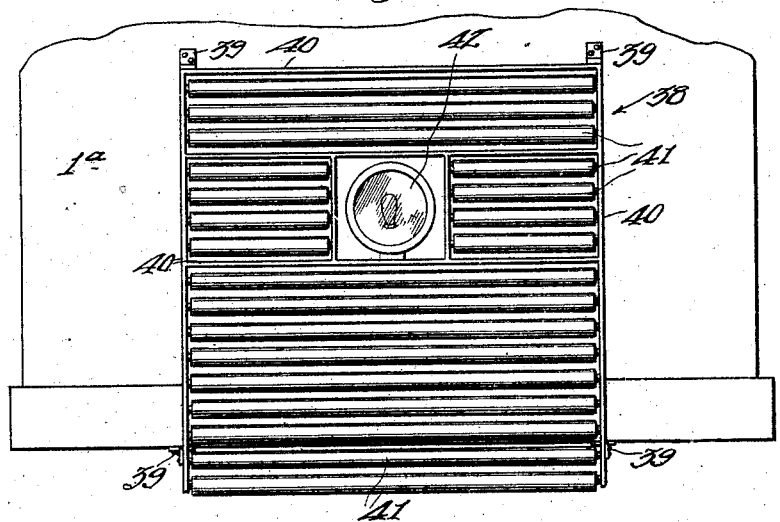
Witnesses
F. Mansfield
M. B. Musgrove
Inventor
Iverd R. Guilford
By G. E. Morpham
Attorney

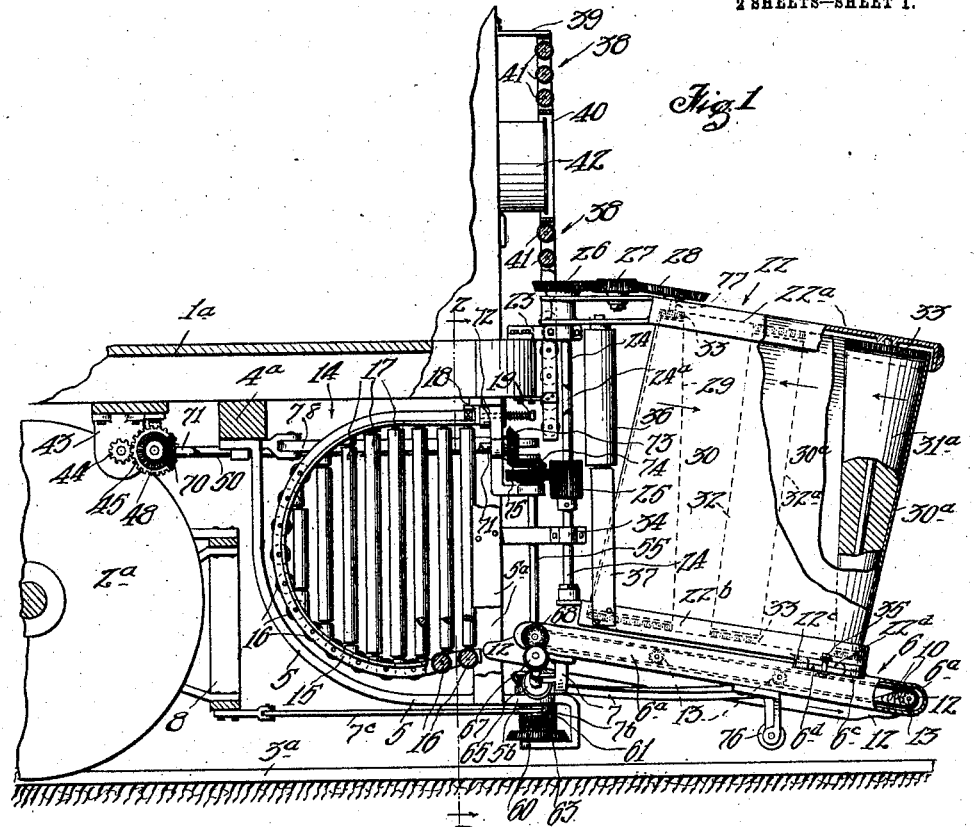

UNITED STATES PATENT OFFICE.

IVERD R. GUILFORD, OF LOS ANGELES, CALIFORNIA.

CAR-FENDER.

No. 850,474.

Specification of Letters Patent.

Patented April 16, 1907.

Application filed January 18, 1907. Serial No. 352,852.

To all whom it may concern:

Be it known that I, IVERD R. GUILFORD, a citizen of the United States, residing at Los Angeles, in the county of Los Angeles and State of California, have invented new and useful Improvements in Car-Fenders, of which the following is a specification.

My invention relates to street-car fenders; and one of the principal objects of the same is to provide reliable and efficient means to save human life; and another object thereof is to protect persons from being seriously injured or maimed, conveying them up the inclined fender by the rotating belt and delivering them upon an auxiliary fender without harm. I accomplish this object by the mechanism described herein and illustrated in the accompanying drawings, in which—

Figure 1 is a side elevation, partly in section, of a car and my improved fender. Fig. 2 is a sectional elevation, looking toward the front of the car, on line 2 2 of Fig. 1. Fig. 3 is a plan of the fender, partly in section, with the car removed. Fig. 4 is a front elevation of the vertical buffer with the various mechanism removed.

The car $1^a$ is of usual construction and has wheels $2^a$, which run upon the surface track $3^a$. Immediately under the car-floor frame is a transverse beam $4^a$, to which is rigidly attached a bifurcated frame 5, having side vertical arms $5^a$ and extension $5^b$, in which is mounted the driving mechanism. The horizontal fender 6 is supported by frame 7, pivotally mounted on extension $5^b$. Frame 7 is composed of converging arms rigidly fastened to the under side casing $6^a$ of the horizontal fender 6. The pivot-bearing $7^a$ is integral with the frame 7 and is provided with an arm $7^b$, as shown in Fig. 2, and a connecting-lever $7^c$, attached to the front frame of the car-truck 8. When the wheels of the car strike a curve in the track, connecting-lever $7^c$ draws on arm $7^b$, thereby partially turning pivot-bearing $7^a$, which causes the front end of the horizontal fender to move over to the center of the track.

The horizontal fender 6 is slightly inclined downward toward the front and has side casings $6^a$, supported by the frame 7, and has a series of rigidly-mounted curving shafts 9, mounted in the side of the casing $6^a$. A series of revoluble spools 10, spaced apart by sleeves 11, are mounted on shafts 9, and a flexible endless belt 12 rotates on these spools. Within the casing $6^a$ is placed a series of sharp-tooth pulleys 13, which keep the belt 12 from moving transversely.

Adjustably mounted above the bifurcated frame 5 is an auxiliary fender 14. The frame of this fender is constructed of two semicircular resilient arms 15. A series of revoluble rollers 16 are transversely mounted thereon, and a series of vertical rollers 17 is revolubly mounted therein. The upper parts of arms 15 are rigidly held together by cross-piece 18, which carries bolts 19, projecting through rigid hangers 20. Compression-springs 21 are placed on bolts 19 to keep the cross-piece 18 in contact with the hangers 20.

Projecting above the inclined fender 6 are side fenders 22. The upper casing $22^a$ is pivotally supported by means of bracket 23, fastened to the front frame of the car. A vertical driving-shaft 24 projects down through the upper casing and through brackets 23 and is held in place in a stepped bearing on the lower casing $22^b$ and is rotatably held above the bearing by bracket 34, rigidly fastened to arm $5^a$. A driving-gear 25 is rigidly mounted on shaft 24, and at the other end a bevel-gear 26 intermeshes with an idler 27, which idler meshes with a bevel-gear 28, mounted on a shaft 77, projecting through the upper casing $22^a$. Rigidly fastened to shaft 77 is a frusto-cone pulley 29. The lower end of said shaft is mounted in the lower casing $22^b$.

A flexible endless belt 30 rotates on cone-pulleys 29 31, and an idler 32 intervenes to keep the belt taut. Pulleys 29 31 and idler 32 have at the top and bottom sharp-tooth pulleys 33. These teeth are short and enter the material of the belt and keep the same from slipping sidewise. Pulley 31 and idler 32 loosely revolve on the shafts.

Near the front of the casing $22^b$ and projecting from the side is a slotted lug $22^c$. A similar lug $6^c$ projects from the inclined fender-casing $6^a$. A bolt 35 holds these lugs $6^c$ and $22^c$ in slidable connection. In case the car is taking a curve the inclined fender 6 will conform to the track curvature. The side fenders 22 will also swing from the brackets 23 and 34, and the bolt 35 will take up the swaying motion by moving up or down in the slots $6^d$ and $22^d$ of the lugs $6^c$ and $22^c$.

A revoluble roller 36 is interposed between the pulleys 29 and shaft 24 and is mounted on a bracket 37, attached to the lower casing 22ᵇ. The upper end of the roller 36 is rotatably mounted in the frame of the upper casing 22ᵃ of the side fenders 22. This roller acts as a buffer and a protector for shaft 24.

At the front end of the car, interposed between the side fenders 22, is a vertical buffer 38, secured to the car by brackets 39. As plainly seen in Fig. 4, this buffer is constructed of a rigid frame 40 with a series of revoluble rollers 41. A space is left in the center for the headlight 42. In case the headlight is not in use a frame composed of small rollers (not shown) could be inserted in this space.

In the rear of the floor-beam 4 (see Figs. 1 and 3) is a motor 43, energized from the car-current and controlled by a switch. (Not shown.) The motor has a driving-gear, 44 meshing with a driven fly-wheel gear 45 of heavy construction for counterbalancing effect. Gear 45 is rigidly mounted on shaft 46. At each end of this shaft are bevel-gears 47 and 48. Bevel-gear 47 meshes with gear 49, mounted on shaft 50. At the other end of the shaft is bevel-gear 51, which engages gear 52. (See Fig. 2.) Integral with this gear is a flat-face gear 53, mounted on bracket 54. Gear 53 meshes with the driving mechanism of the side fender 22 on the left through long-face gear 25ᵃ, thereby rotating shaft 24ᵃ, bevel-gear 26ᵃ, intermeshing idler 27ᵃ, bevel-gear 28ᵃ, and cone-pulley 29ᵃ. The rotation of the cone-pulley 29ᵃ moves the inner side of the flexible belt 30ᵃ toward the front of the car. Belt 30ᵃ rotates on cone-pulleys 29ᵃ 31ᵃ and idler 32ᵃ, which keeps the central portions of the belt from engaging in case there is too much slack. On shaft 55 are rigidly mounted gears 52 53. This last shaft projects down through bracket 54 (see Fig. 2) and has a bevel-gear 56 mounted thereon, which gear meshes with gear 57, mounted on shaft 58. On the other end of shaft 58 is gear 59. A bevel-gear 60, integral with long-face gear 61, is mounted on a bracket of the bifurcated frame extension 5ᵇ and meshes with bevel-gear 59. The pivot-bearing 7ᵃ of the inclined fender-frame 7 has a shaft 62 projecting through it on which is mounted gear 63 at the lowest side of said bearing, which gear meshes with the long-face gear 61, and at the higher side of said bearing on shaft 62 is mounted bevel-gear 64. The gear 64 meshes with gear 65, rotating the inclined shaft 66, mounted in a bearing on the inner converging arm of the frame 7. At the other end of the shaft a driving-gear 67 meshes with a driven bevel-gear 68, which rotates the sharp-tooth pulley 69 and revolves the belt 12 in the direction of the arrow in Fig. 2.

The bevel-gear 48 is the driving source of the right-side fender 22 of Fig. 2. Gear 48 meshes with a bevel-gear 70, mounted on shaft 71, which last shaft is mounted in brackets 72 under the floor of the car. Shaft 71 has a bevel-gear 73, (see Figs. 1 and 2,) engaging a bevel-gear 74, integral with a flat-face gear 75, mounted on the bracket 72. Gear 75 meshes with the driving mechanism of the flat-face gear 25, mounted on shaft 24, rotating gears 26 27 28 and cone-pulleys 29 and 31, thereby revolving the endless belt 30 at its inner side toward the front of the car.

The object of the long faces on gears 25, 25ᵃ, and 61 is to keep the teeth in mesh in case the car is ascending or descending a hill. In ascending a hill rollers 76, mounted in a bracket at the ends of the outer converging arms of the frame 7, will engage the tread of the surface tracks, lifting the bearing 7ᵃ upwardly through the extension 5ᵇ, which will lift the inclined fender 6 and right and left side fenders 22 and the various respective rotating mechanisms.

The endless belts 12, 30, and 30ᵃ could be preferably made of a rough or corrugated surface on their outer sides. A coupler-bar 78 is attached to the floor-beam 4ᵃ, so that when the fender is removed the car may be coupled with another car.

The source of current energizing the motor is independent of the car-controller, and in case a person should be on the track and the motorman should not be able to stop the car before reaching him the inclined fender would strike him. The front edge of the fender being curved inwardly toward the car the person would be thrown toward the center of the fender if he should be struck by either side. The endless belt of the inclined fender would then carry the person up and deposit him on the auxiliary fender, where he would be safe.

Having described my invention, what I claim is—

1. In a street-car fender, a bifurcated frame; a horizontal fender pivotally secured therein; a series of curving shafts rigidly mounted in the sides of the casings, a series of revoluble spools mounted thereon and a flexible belt rotating on the periphery of said spools, and means for rotating said belt.

2. In a street-car fender; a horizontal fender pivotally supported; a series of spools revolubly mounted on a series of rigid curving shafts; a belt on said spools; means for rotating the belt; and means for causing the fender to follow the curvature of the surface track, without disengaging the rotative mechanism.

3. In a street-car fender, the combination of an inclined fender pivotally supported; a belt rotating on a series of spools revolubly mounted on rigid curving shafts on said inclined fender; vertical side fenders pivotally secured to the car and slidably mounted on the inclined fender; a series of vertical frusto-cone pulleys on said vertical side fenders; belts rotating on said pulleys; means for rotating the belts on said inclined and vertical fenders in unison; and means for turning the inclined fender and the vertical side fenders, to follow the curvature of the track.

In witness that I claim the foregoing I have hereunto subscribed my name this 10th day of January, 1907.

IVERD R. GUILFORD.

Witnesses:
G. E. HARPHAM,
F. A. MANSFIELD.